(12) United States Patent
Ogura

(10) Patent No.: US 7,718,143 B2
(45) Date of Patent: May 18, 2010

(54) FILTER CATALYST FOR PURIFYING EXHAUST GASES

(75) Inventor: Yoshitsugu Ogura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 375 days.

(21) Appl. No.: 10/743,060

(22) Filed: Dec. 23, 2003

(65) Prior Publication Data
US 2005/0074374 A1 Apr. 7, 2005

(30) Foreign Application Priority Data
Jan. 10, 2003 (JP) ............................. 2003-004339

(51) Int. Cl.
*B01D 50/00* (2006.01)
(52) U.S. Cl. ..................................... 422/180
(58) Field of Classification Search ................ 422/168; 502/527.19, 527.23
See application file for complete search history.

(56) References Cited

U.S. PATENT DOCUMENTS

| 4,448,833 A | 5/1984 | Yamaguchi et al. ......... 428/116 |
| 4,833,115 A | 5/1989 | Koschlig et al. ............ 502/439 |

FOREIGN PATENT DOCUMENTS

| CN | 1330212 A | 6/2001 |
| DE | 3744020 A1 | 7/1989 |
| DE | 3928790 A1 | 3/1991 |
| EP | 0 153 911 | 9/1985 |
| EP | 0 766 993 | 4/1997 |
| EP | 1245262 A1 * | 10/2002 |
| JP | 59 142820 | 8/1984 |
| JP | 01-304022 | 12/1989 |
| JP | 02-188614 | 7/1990 |
| JP | 7-106290 | 11/1995 |
| JP | 09-085028 | 3/1997 |
| JP | 09-094434 | 4/1997 |

(Continued)

OTHER PUBLICATIONS

European Search Report for EP 03 02 9790 dated Apr. 15, 2004.

(Continued)

*Primary Examiner*—Tom Duong
(74) *Attorney, Agent, or Firm*—Finnegan, Henderson, Farabow, Garrett & Dunner, LLP

(57) ABSTRACT

A filter catalyst is for purifying exhaust gases, and comprises a honeycomb structure, a catalytic layer and a fibrous layer. The honeycomb structure comprises inlet cells clogged on a downstream side of a flow of the exhaust gases, outlet cells neighboring the inlet cells, and clogged on an upstream side of the flow of the exhaust gases, and cellular walls demarcating the inlet cells and the outlet cells, and having pores. The catalytic layer is formed on a surface of the cellular walls and an inner surface of the pores, and includes a porous oxide and a catalytic ingredient loaded on the porous oxide. The fibrous layer is formed on the outermost surface of the cellular walls of the inlet cells at least, and includes entangled fibrous substances composed of a heat-resistant material. The filter catalyst inhibits the pressure loss from increasing and upgrades the oxidizing rate of PMs greatly.

3 Claims, 2 Drawing Sheets

FOREIGN PATENT DOCUMENTS

| | | |
|---|---|---|
| JP | 09-220423 | 8/1997 |
| JP | 2000-342967 | 12/2000 |
| JP | 2001-079391 | 3/2001 |
| JP | 2001-104783 | 4/2001 |
| JP | 2001-355431 | 12/2001 |
| JP | 2002-276339 | 9/2002 |
| JP | 2002-295226 | 10/2002 |
| JP | 2002-309923 | 10/2002 |
| JP | 2002-355511 | 12/2002 |
| JP | 2002-3555111 | 12/2002 |

OTHER PUBLICATIONS

Japanese Office Action dated Jun. 27, 2008.

* cited by examiner

FILTER CATALYST FOR PURIFYING EXHAUST GASES

BACKGROUND OF THE INVENTION

1. Field of the Invention

The present invention relates to a filter catalyst for purifying exhaust gases, such as those emitted from diesel engines and including particulates.

2. Description of the Related Art

Regarding gasoline engines, harmful components in the exhaust gases have been reduced securely by the strict regulations on the exhaust gases and the technological developments capable of coping with the strict regulations. However, regarding diesel engines, the regulations and the technological developments have been advanced less compared to those of gasoline engines because of the unique circumstances that the harmful components are emitted as particulates (i.e., particulate materials, such as carbonaceous fine particles, sulfuric fine particles like sulfates, and high-molecular-weight hydrocarbon fine particles, hereinafter collectively referred to as "PMs").

As exhaust gas-purifying apparatuses having been developed so far for diesel engines, the following have been known. For example, the exhaust gas-purifying apparatuses can be roughly divided into trapping (or wall-flow) exhaust gas-purifying apparatuses and open (or straight-flow) exhaust gas-purifying apparatuses. Among these, clogged honeycomb structures made from ceramic (i.e., diesel PMs filters, hereinafter referred to as "DPFs") have been known as one of the trapping exhaust gas-purifying apparatuses. In the DPFs, the honeycomb structures are clogged at the opposite openings of cells in a checkered manner alternately, for instance. The DPFs comprise inlet cells clogged on the downstream side of the flow of exhaust gases, outlet cells neighboring the inlet cells and clogged on the upstream side of the flow of the exhaust gases, and cellular walls demarcating the inlet cells and the outlet cells. The DPFs inhibit the emission of PMs by filtering the exhaust gases with the pores of the cellular walls to collect PMs.

In the DPFs, however, the pressure loss increases as PMs deposit thereon. Accordingly, it is needed to regularly remove deposited PMs to recover the DPFs by certain means. Hence, when the pressure loss increases, deposited PMs have been burned with burners or electric heaters conventionally, thereby recovering the DPFs. However, in this case, the greater the deposition of PMs is, the higher the temperature increases in burning deposited PMs. Consequently, there might arise cases that the DPFs are damaged by thermal stress resulting from such burning.

Hence, as set forth in Japanese Examined Patent Publication (KOKOKU) No. 7-106,290, Japanese Unexamined Patent Publication (KOKAI) No. 9-94,434 and Japanese Unexamined Patent Publication (KOKAI) No. 2001-79,391, continuously regenerative DPFs have been developed recently. For example, in the continuously regenerative DPF disclosed in Japanese Examined Patent Publication (KOKOKU) No. 7-106,290, a coating layer comprising alumina is formed on the surface of the cellular walls of the DPF, and a catalytic ingredient such as platinum (Pt) is loaded on the coating layer. In accordance with the continuously regenerative DPFs, since the collected PMs are oxidized and burned by the catalytic reaction of the catalytic ingredient, it is possible to regenerate the DPFs by burning PMs simultaneously with or successively after collecting PMs. Moreover, since the catalytic reaction occurs at relatively low temperatures, and since PMs can be burned when they are collected less, the continuously regenerative DPFs produce an advantage that the thermal stress affecting the DPFs is so less that the DPFs are inhibited from being damaged.

Moreover, Japanese Unexamined Patent Publication (KOKAI) No. 9-94,434 discloses a continuously regenerative DPF in which a coating layer with a catalytic ingredient loaded is formed not only on the cellular walls but also in the pores of the cellular walls. When the catalytic ingredient is further loaded in the pores, the contact probability of PMs to the catalytic ingredient increases, and it is possible to oxidize and burn PMs collected in the pores. In addition, the publication describes an $NO_x$ absorbent to be further loaded on the coating layer. With such an arrangement, $NO_x$ absorbed onto the $NO_x$ absorbent are released as $NO_2$ at high temperatures, and accordingly it is possible to further facilitate the oxidation of PMs by the resulting $NO_2$.

However, it has been found out that a part of PMs in exhaust gases agglomerate while flowing from an exhaust manifold to the continuously regenerative DPF. Then, PMs have grown granularly to a particle diameter of from 1 to 10 μm or even more than 10 μm. The thus grown PMs are less likely to come into the pores of the cellular walls so that they have deposited on the surface of the cellular walls. Accordingly, it comes to be more difficult for PMs to come into the pores. As a result, the deposition of PMs on the cellular walls has enlarged sharply to increase the pressure loss. Moreover, the contact probability of PMs to the catalytic ingredient loaded inside the cellular walls has dropped sharply to remarkably lower the oxidizing rate of PMs.

SUMMARY OF THE INVENTION

A filter catalyst for purifying exhaust gases according to the present invention comprises:

a honeycomb structure comprising:
  inlet cells clogged on a downstream side of a flow of the exhaust gases;
  outlet cells neighboring the inlet cells, and clogged on an upstream side of the flow of the exhaust gases; and
  cellular walls demarcating the inlet cells and the outlet cells, and having pores;

a catalytic layer formed on a surface of the cellular walls and an inner surface of the pores, and including a support powder composed of a porous oxide and a catalytic ingredient loaded on the support powder; and a fibrous layer formed on the outermost surface of the cellular walls of the inlet cells at least, and including entangled fibrous substances composed of a heat-resistant material.

Further, an oxidizing catalyst can preferably be loaded on the fibrous layer. Furthermore, the fibrous layer can preferably exhibit a porosity of from 30 to 80% by volume. Moreover, the fibrous substances can preferably exhibit an aspect ratio of from 1 to 60.

Thus, in accordance with the present exhaust gas-purifying filter catalyst, it is possible to upgrade the oxidizing rate of PMs greatly and suppress the increase of the pressure loss resulting from the deposition of PMs from increasing.

DETAILED DESCRIPTION OF THE PREFERRED EMBODIMENTS

Figure 1:
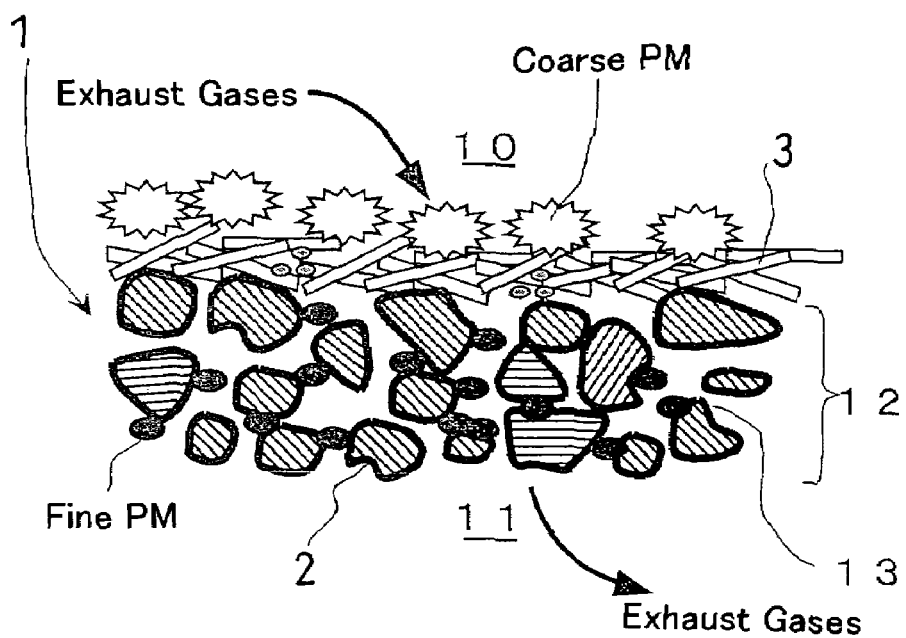
FIG. 1 is a schematic enlarged major cross-sectional view of a filter catalyst according to Example No. 1 of the present invention.

Having generally described the present invention, a further understanding can be obtained by reference to the specific preferred embodiments which are provided herein for the purpose of illustration only and not intended to limit the scope of the appended claims.

In the present exhaust gas-purifying filter catalyst, the fibrous layer in which fibrous substances composed of a heat-resistant material are entangled is formed on the outermost surface of the cellular walls of the inlet cells at least. The fibrous layer comprises fibrous substances which are entangled like a net. Since the fibrous layer traps PMs having larger particle diameters while the PMs are flowing to the surface of the cellular walls, it is suppressed to close the pore openings in the cellular walls. Moreover, the fibrous layer exhibits such a high porosity that it is provided with many spaces for gas flow. Accordingly, the fibrous layer exhibits a high gas permeability even when PMs are trapped onto the fibrous layer. In addition, when an oxidizing catalyst is loaded on the fibrous layer, the oxidizing catalyst decomposes hydrocarbon components (or soluble organic fractions, hereinafter abbreviated to as "SOF"), which make a binder of coarse PMs, so that PMs are pulverized finely. Therefore, PMs having smaller particle diameters arrive at the cellular walls through the spaces in the fibrous layer, and are trapped in the pores of the cellular walls. Since the catalytic layer is formed in the pores, the trapped PMs are oxidized by the catalytic ingredient, and do not close the pores.

PMs having larger particle diameters trapped onto the fibrous layer burn when high-temperature exhaust gases pass on them. Accordingly, it is possible to inhibit PMs from depositing on the fibrous layer in a greater amount so that the pressure loss is increased less. Moreover, even when major-diameter pore having a pore diameter of 50 μm or more are opened in the surface of the cellular walls, the opening diameters are reduced because the fibrous substances exist over the openings like a bridge. Consequently, the present exhaust gas-purifying filter catalyst can show a high PM-trapping efficiency from initial period.

Moreover, it is possible to remarkably reduce the deposition of ashes because PMs are suppressed to deposit on the surface of the cellular walls. The advantage results from that the amount of the PMs that flows the pores in the cellular walls increases, where the catalytic layer formed in the pores oxidizes and burns PMs and the resulting ash components flow out simultaneously.

The honeycomb structure comprises inlet cells, outlet cells, and cellular walls. The inlet cells are clogged on the downstream side of the flow of exhaust gases. The outlet cells neighbor the inlet cells, and are clogged on the upstream side of the flow of the exhaust gases. The cellular walls demarcate the inlet cells and the outlet cells.

The honeycomb structure can be produced out of heat-resistant ceramics such as cordierite. For example, a clayey slurry whose major component is a cordierite powder is prepared, is then formed by extruding, for instance, and is finally calcined. Instead of the cordierite powder, it is possible to compound alumina, magnesia and silica powders to make the cordierite composition. Thereafter, a half of the cells are clogged with a similar clayey slurry in a checkered manner at one of the opposite openings in one of the opposite-end surfaces of the honeycomb structure, and the other half of the cells which neighbor the cells clogged at one of the opposite openings are clogged with the same at the other one of the opposite openings in the other one of the opposite-end surfaces. Finally, the clogging slurry is fixed by calcining, for example. Thus, the honeycomb structure can be produced.

Moreover, the pores can be formed in the cellular walls of the honeycomb structure in the following manner. A combustible powder such as carbon powders, wood powders, starch and resinous powders is mixed in the slurry, and is burned out during sintering to form the pores. Note that it is possible to control the pore diameter and porosity of the pores by adjusting the particle diameter and addition amount of the combustible powder. The pores communicate the inlet cells with the out cells to each other. As a result, PMs are trapped in the pores, but gases can pass from the inlet cells to the outlet cells through the pores.

The porosity of the cellular walls can desirably be from 60 to 80% by volume. When the porosity falls in the range, it is possible to suppress the pressure loss to increase even when the catalytic layer is formed in an amount of from 100 to 200 g with respect to 1 L of the honeycomb structure, and to further keep the strength of the honeycomb structure from lowering. Moreover, it is possible to trap PMs much more efficiently.

On the surface of the cellular walls and the inner surface of the pores, the catalytic layer is formed. The catalytic layer includes a support powder composed of a porous oxide, and a catalytic ingredient loaded on the support powder. As for the support powder, it is possible to use oxides such as $Al_2O_3$, $ZrO_2$, $CeO_2$, $TiO_2$ and $SiO_2$, or composite oxides composed of a plurality of them.

The catalytic layer can be formed in the following manner. The support powder is mixed with a binder component, such as an alumina sol, and water to make a slurry. The resulting slurry is deposited on the cellular walls. Thereafter, the deposited slurry is calcined to make a coating layer. Then, a catalytic ingredient is loaded on the coating layer. Alternatively, a catalytic ingredient can be loaded on the support powder in advance. The resulting catalytic powder can be used to prepare a slurry. The thus prepared slurry can be used to form a coating layer. In order to deposit a slurry on the cellular walls, it is possible to employ the ordinary immersion method. However, it is preferable to compulsorily fill a slurry into the pores of the cellular walls and to simultaneously remove the excessive slurry which has entered the pores by blowing air or suction.

When forming the coating layer or catalytic layer, it is preferable to form the coating layer or catalytic layer in an amount of from 100 to 200 g with respect to 1 L of the honeycomb structure. When the coating layer or catalytic layer is formed in an amount of less than 100 g with respect to 1 L of the honeycomb structure, it is inevitable that the durability of catalytic ingredients lowers. When the coating layer or catalytic layer is formed in an amount of more than 200 g with respect to 1 L of the honeycomb structure, it is not practical because the pressure loss increases too much.

As for the catalytic ingredient included in the catalytic layer, it is possible to use catalytic ingredients which promote the oxidation of PMs by a catalytic reaction. However, it is preferable to use at least one member selected from the group consisting of the platinum group elements such as Pt, Rh and Pd, or a plurality of them. It is preferable to load a noble metal in an amount of from 1 to 5 g with respect to 1 L of the honeycomb structure. When the loading amount is less than the lower limit, it is not practical because the activity of noble metals is too poor. When the loading amount exceeds the upper limit, not only the activity of noble metals saturates but also the cost has gone up. A noble metal can be loaded by adsorption loading methods or impregnation loading methods with a solution in which a nitrate of noble metals is solved, for instance.

The catalytic layer can preferably further include an $NO_x$-sorbing member selected from the group consisting of alkali metals, alkaline-earth metals and rare-earth elements. When the catalytic layer includes an $NO_x$-sorbing member, the purifying activity of $NO_x$ is upgraded because it is possible to sorb $NO_x$, which are generated by oxidizing exhaust gases with the catalytic ingredient, by the $NO_x$-sorbing member. As for the $NO_x$-sorbing member, it is possible to use at least one member selected from the group consisting of alkali metals, alkaline-earth metals and rare-earth elements. The alkali metals can be K, Na, Cs and Li. The alkaline-earth metals can be Ba, Ca, Mg and Sr. The rare-earth elements can be Sc, Y, Pr and Nd. Among them, it is preferable to use at least one member selected from the group consisting of alkali metals and alkaline-earth metals which are good in terms of the $NO_x$-sorbing ability.

The loading amount of the $NO_x$-sorbing member can preferably fall in a range of from 0.15 to 0.45 mol with respect to 1 L of the honeycomb structure. When the loading amount is less than 0.15 mol with respect to 1 L of the honeycomb structure, the purifying activities of the resulting catalytic layers are too less to be practical. When the $NO_x$-sorbing member is loaded more than 0.45 mol with respect to 1 L of the honeycomb structure, the $NO_x$-sorbing member covers the catalytic ingredient to degrade the activities of the resulting catalytic layers. The $NO_x$-sorbing member can be loaded on the catalytic layer in the following manner. The $NO_x$-sorbing member is loaded on the catalytic layer by impregnation loading methods with a solution in which an acetate or nitrate of the $NO_x$-sorbing member is solved. Alternatively, the $NO_x$-sorbing member can be loaded on the support powder in advance. Then, the catalytic layer can be formed with the resulting powder.

Moreover, the catalytic layer can preferably further include an $NO_x$ adsorbent which adsorbs $NO_x$ at low temperatures and releases $NO_x$ at high temperatures. With such an arrangement, NO in exhaust gases are adsorbed onto the $NO_x$ adsorbent as $NO_2$ in a lower temperature region, the adsorbed $NO_2$ is released from the $NO_x$ adsorbent in a higher temperature region, and the released $NO_2$ promotes to purify PMs by oxidation. As for the $NO_x$ adsorbent, it is possible to use powders comprising zirconia with a noble metal loaded, or powders comprising $CeO_2$ with a noble metal loaded.

The fibrous layer, one of the characteristics of the present filter catalyst, is formed on the outermost surface of the cellular walls of the inlet cells at least, and includes entangled fibrous substances composed of a heat-resistant material. As for the fibrous substances composed of a heat-resistant material, it is possible to exemplify ceramic fibers or whiskers, and metallic short fibers. The ceramic fibers or whiskers can comprise alumina, titania, zirconia, alkali titanate, silicon carbide or mullite, for example. The metallic short fibers can comprise steels.

It is preferable that the fibrous layer can exhibit a porosity of from 30 to 80% by volume. Thus, it is possible to suppress the PM-collecting efficiency to lower and to further suppress the pressure loss to increase in collecting PMs. Moreover, when the porosity of the fibrous layer falls in the range, it is possible to secure the permeability of exhaust gases to a certain extent even when the fibrous layer is thickened. Therefore, in view of the pressure loss, the thinner the thickness of the fibrous layer is the more preferable it is. In view of the PM-collecting efficiency, the thicker the thickness of the fibrous layer is the more preferable it is. However, the thickness of the fibrous layer is not limited in particular. When the porosity of the fibrous layer is less than 30% by volume, it is not preferable because the pressure loss increases greatly in collecting PMs. When the porosity of the fibrous layer exceeds 80% by volume, the initial PM-collecting efficiency degrades.

In order to control the porosity of the fibrous layer in the range, it is desirable to use fibrous substances whose aspect ratio is from 1 to 60. When the aspect ratio is less than 1 or exceeds 60, it is difficult to control the porosity of the fibrous layer in the range. Specifically, it is more preferable to use fibrous substances whose diameter is from 0.5 to 5 µm and length is from 5 to 30 µm. When the fibrous substances have such a diameter and length, it is possible to control the aspect ratio within the range with ease. Moreover, it is possible to inhibit the fibrous substances from coming into the pores of the cellular walls in forming the fibrous layer, and accordingly it is possible to inhibit the fibrous substances from closing the pores.

The fibrous layer can preferably be applied to the outermost surface of the cellular walls in a unitary a real weight of from 3 to 11 $g/m^2$. When the fibrous layer is applied in a unitary a real weight within the range, the diameter of the communication spaces communicating the outermost surface with the innermost surface is optimum for collecting PMs having a larger particle diameter so that the fibrous layer does not adversely affect the pressure loss. When the unitary a real weight exceeds 11 $g/m^2$, it is not preferable because the pressure loss is likely to increase in collecting PMs. Moreover, when the unitary a real weight is less than 3 $g/m^2$, PMs having a larger particle diameter have passed through the resulting fibrous layer to deposit on the cellular walls so that the pressure loss increases.

The fibrous layer can be formed in the following manner, for example. A slurry is prepared by mixing fibrous substances with a binder, such as alumina sol and silica sol, and a solvent. The resulting slurry is injected at least into the inlet cells of a honeycomb substrate on which a catalytic layer is formed. Then, the slurry is calcined to form the fibrous layer. Alternatively, the fibrous layer can be formed by the following dry method, for instance. Fibrous substances are suctioned together with air through the outlet cells of a honeycomb substrate on which a catalytic layer is formed, and are thereby deposited on the cellular walls of the inlet cells. Then, the deposited fibrous substances are calcined to form the fibrous layer. For the purpose of forming the fibrous layer, it is necessary to form it on the inlet cells at least. However, it does not matter at all to form the fibrous layer on the outlet cells as well.

The fibrous layer can preferably be further loaded with an oxidizing catalyst. With such an arrangement, the oxidizing rate of PMs can be upgraded remarkably because the oxidizing catalyst oxidizes PMs having a larger particle diameter, which are collected onto the fibrous layer, in addition to the oxidation of PMs by the catalytic layer. Moreover, when the oxidizing catalyst burns SOF contained in PMs, PMs having a larger particle diameter are decomposed into finer particles because the binder components disappear by the burning. Accordingly, the resulting finer particles come into the pores of the cellular walls with ease, and are oxidized by the catalytic layer eventually. Therefore, not only it is possible to further upgrade the oxidizing rate of PMs, but also to further suppress the pressure loss increment, because PMs are furthermore suppressed to deposit on the fibrous layer.

Moreover, when PMs having a larger particle diameter are oxidized and burned at the fibrous layer, the pressure loss might increase because larger ashes deposit on the fibrous layer. On the contrary, when PMs having a larger particle diameter are decomposed to PMs having a smaller particle diameter and the resulting fine PMs are burned in the pores of the cellular walls, it is possible as described above to further suppress the pressure loss increment because fine ashes are likely to be emitted together with exhaust gases.

The oxidizing catalyst can be loaded in the following manner, for example. An oxidizing catalyst powder is prepared which comprises a support powder, such as alumina powders, and a noble metal, such as Pt, Rh and Pd, is loaded on the support powder. The resultant oxidizing catalyst powder is deposited on the fibrous layer by the wet or dry method. The deposited oxidizing catalyst powder is calcined to load an oxidizing catalyst on the fibrous layer. Alternatively, when the fibrous layer is composed of alumina fibers, an oxidizing catalyst can be loaded on the fibrous layer by loading a noble metal on alumina fibers in the same manner as noble metals are loaded on alumina supports in conventional exhaust gas-purifying catalysts. The latter loading method is more preferable because it hardly changes the porosity of the fibrous layer.

When noble metals are loaded on the fibrous layer as the oxidizing catalyst, noble metals can preferably be loaded on the fibrous layer in an amount of from 0.01 to 0.5 g with respect to 1 L of the honeycomb structure. When the loading amount of noble metals is less than 0.01 g with respect to 1 L of the honeycomb structure, it is difficult for noble metals to show advantages as the oxidizing catalyst. When the loading amount of noble metals exceeds 0.5 g with respect to 1 L of the honeycomb structure, the advantages resulting from noble metals saturate, and at the same time the material cost has gone up.

EXAMPLES

The present filter catalyst will be hereinafter described in more detail with reference to specific embodiments and comparative examples.

Example No. 1

FIG. 1 illustrates a major cross-sectional view of a filter catalyst for purifying exhaust gases according to Example No. 1 of the present invention. The filter catalyst comprises a honeycomb filter 1, a catalytic layer 2, and a fibrous layer 3. The honeycomb filter 1 comprises inlet cells 10 clogged on the downstream side of the flow of exhaust gases, outlet cells 11 clogged on the upstream side of the flow of exhaust gases, and cellular walls 12 in which a great number of pores 13 are formed. Not only the pores 13 communicate with each other, but also communicate with the inlet cells 10 and the outlet cells 11.

The catalytic layer 2 comprises a support composed of a mixture powder of $Al_2O_3$ and $CeO_2$, and Pt loaded on the support. Note that the catalytic layer 2 is formed on both surfaces of the cellular walls 12 and pores 13.

The fibrous layer 3 comprises entangled alumina fibers on which Pt is loaded, and is formed mainly on the surface of the cellular walls 12 of the inlet cells 10. A production process of the filter catalyst according to Example No. 1 will be hereinafter described instead of the detailed description on the arrangement.

A commercially available honeycomb filter 1 was prepared whose average pore diameter was 30 μm, porosity was 60% by volume and volume was 2 L, and which had inlet cells 10 and outlet cells 11. Subsequently, a slurry was prepared, and was subjected to milling so that the solid particles had an average particle diameter of 1 μm or less. Note that the slurry comprised an $Al_2O_3$ powder, a $CeO_2$ powder, an alumina sol, and ion-exchanged water. The honeycomb filter 1 was immersed into the slurry so as to inject the slurry into the cells. Then, the honeycomb filter 1 was taken up from the slurry, and was suctioned through one of the opposite ends to remove the excessive slurry. After the honeycomb filter 1 was ventilated to dry, it was calcined at 450° C. for 2 hours. The overall operations were repeated twice. In the second operation, the honeycomb filter 1 was suctioned through the other one of the opposite ends in order that a coating layer was formed in substantially the same amount on the inlet cells 10 and on the outlet cells 11, respectively. Note that the coating layer was formed in an amount of 100 g with respect to 1 L of the honeycomb filter 1.

Thereafter, the honeycomb filter 1 was impregnated with a predetermined amount of a dinitrodiammine platinum nitrate aqueous solution having a prescribed concentration. After the honeycomb filter 1 was dried, it was calcined to load Pt on the coating layer. Thus, a catalytic layer 2 was formed. Note that Pt was loaded in an amount of 2 g with respect to 1 L of the honeycomb filter 1.

Moreover, commercially available $Al_2O_3$ fibers were prepared whose average diameter was 1 μm. The $Al_2O_3$ fibers were subjected to milling to a length of 20 μm approximately. The $Al_2O_3$ fibers were charged into a predetermined amount of a dinitrodiammine platinum nitrate aqueous solution having a prescribed concentration. The dinitrodiammine platinum nitrate aqueous solution was evaporated to dryness to load Pt on the $Al_2O_3$ fibers in an amount of 2% by weight with respect to the sum of the $Al_2O_3$ fibers and Pt taken as 100% by weight.

The resulting $Al_2O_3$ fibers with Pt loaded were mixed with an alumina sol, a trace amount of an alumina powder, and ion-exchanged water, thereby preparing a slurry. Then, the honeycomb filter 1 provided with the catalytic layer 2 was immersed into the resultant slurry from the end of the inlet cells 10. After the honeycomb filter 1 was taken up from the slurry, it was suctioned through the outlet cells 11. Finally, the honeycomb filter 1 was dried and calcined to form a fibrous layer 3 mainly on the surface of the cellular walls 12 of the inlet cells 10. Note that the fibrous layer 3 was formed in an amount of 10.4 g with respect to 1 L of the honeycomb filter 1, and that it was applied in a unitary a real weight of 9.6 g/m². Moreover, when the fibrous layer 3 was examined for the porosity by observing it with a microscope, it was found to exhibit a porosity of 50% by volume approximately.

Example No. 2

A slurry was prepared which comprised an $Al_2O_3$ powder, a $TiO_2$ powder, a $ZrO_2$ powder, an alumina sol and ion-exchanged water, and was subjected to milling so that the solid particles had an average particle diameter of 1 μm or less. Except the thus prepared slurry was used, a coating layer was formed and a catalytic layer 2 was formed by loading Pt on the resulting coating layer in the same manner as Example No. 1.

The resultant honeycomb filter 1 provided with the catalytic layer 2 was measured for the water absorption. The honeycomb filter 1 was absorbed with a predetermined amount of a potassium acetate aqueous solution having a prescribed concentration. After the honeycomb filter 1 was dried, it was calcined to load K on the catalytic layer 2. Note that K was loaded in an amount of 0.2 mol with respect to 1 L of the honeycomb filter 1.

Finally, a fibrous layer 3 was formed in the same manner as Example No. 1. Note that the fibrous layer 3 was formed in an amount of 10.9 g with respect to 1 L of the honeycomb filter 1, and that it was applied in a unitary a real weight of 10.0 g/m². Moreover, when the fibrous layer 3 was examined for the porosity by observing it with a microscope, it was found to exhibit a porosity of 50% by volume approximately.

Example No. 3

Commercially available $TiO_2$ fibers were prepared whose average diameter was 0.5 μm and average length was 10 μm. The $TiO_2$ fibers were charged into a predetermined amount of a dinitrodiammine platinum nitrate aqueous solution having a prescribed concentration. The dinitrodiammine platinum nitrate aqueous solution was evaporated to dryness to load Pt on the $TiO_2$ fibers in an amount of 2% by weight with respect to the sum of the $TiO_2$ fibers and Pt taken as 100% by weight.

The resulting $TiO_2$ fibers with Pt loaded were mixed with isopropyl alcohol, a surfactant, a trace amount of a $TiO_2$ powder and ion-exchanged water, thereby preparing a slurry. Then, the fibrous layer 3 was formed in the same manner as Example No. 1 on the honeycomb filter 1 which was provided with the catalytic layer 2 loaded with Pt and K in the same manner as Example No. 2. Note that the fibrous layer 3 was formed in an amount of 9.8 g with respect to 1 L of the honeycomb filter 1, and that it was applied in a unitary a real weight of 9.0 g/m². Moreover, when the fibrous layer 3 was examined for the porosity by observing it with a microscope, it was found to exhibit a porosity of 50% by volume approximately.

Example No. 4

Commercially available SiC fibers were prepared whose average diameter was 3 μm and average length was 30 μm. The SiC fibers were charged into a predetermined amount of a dinitrodiammine platinum nitrate aqueous solution having a prescribed concentration. The dinitrodiammine platinum nitrate aqueous solution was evaporated to dryness to load Pt on the SiC fibers in an amount of 2% by weight with respect to the sum of the SiC fibers and Pt taken as 100% by weight.

The resulting SiC fibers with Pt loaded were mixed with isopropyl alcohol, a surfactant, a trace amount of a $TiO_2$ powder and ion-exchanged water, thereby preparing a slurry. Then, the fibrous layer 3 was formed in the same manner as Example No. 1 on the honeycomb filter 1 which was provided with the catalytic layer 2 loaded with Pt and K in the same manner as Example No. 2. Note that the fibrous layer 3 was formed in an amount of 11.2 g with respect to 1 L of the honeycomb filter 1, and that it was applied in a unitary a real weight of 10.3 g/m². Moreover, when the fibrous layer 3 was examined for the porosity by observing it with a microscope, it was found to exhibit a porosity of 50% by volume approximately.

Example No. 5

A filter catalyst for purifying exhaust gases was prepared in the same manner as Example No. 4. However, the resulting fibrous layer 3 was formed in an amount of 4.2 g with respect to 1 L of the honeycomb filter 1, was applied in a unitary a real weight of 3.9 g/m², and exhibited a porosity of 80% by volume approximately.

Example No. 6

Except that commercially available $TiO_2$ fibers were used whose average diameter was 0.5 μm and average length was 3 μm, a filter catalyst for purifying exhaust gases was prepared in the same manner as Example No. 3. However, the resulting fibrous layer 3 was formed in an amount of 11.5 g with respect to 1 L of the honeycomb filter 1, was applied in a unitary a real weight of 10.6 g/m², and exhibited a porosity of 30% by volume approximately.

Comparative Example No. 1

Except that the fibrous layer 3 was not formed, a filter catalyst for purifying exhaust gases was prepared in the same manner as Example No. 2.

Comparative Example No. 2

Except that the slurry was not subjected to milling, the coating layer was formed in an amount of 100 g with respect to 1 L of the honeycomb filter 1 and Pt was loaded on the coating layer to form the catalytic layer 2 in the same manner as Example No. 1. Note that the alumina powder making the coating layer had an average particle diameter of 3.5 μm. As a result, most of the coating layer was formed on the surface of the cellular walls 12 of the inlet cells 10 to close the open pores which had been opened in the cellular walls 12.

Test and Assessment

The respective filter catalysts according to Example Nos. 1 through 6 as well as Comparative Example Nos. 1 and 2 were installed to an exhaust system of a diesel engine whose displacement was 2 L, respectively. The diesel engine was driven on a bench repeatedly in a driving pattern which was equivalent to the following driving conditions:
  a) idling;
  b) accelerating to 60 km/hr.;
  c) travelling ordinarily at 60 km/hr.;
  d) idling;
  e) accelerating to 100 km/hr.; and
  f) travelling ordinarily at 100 km/hr.

While driving the diesel engine in the above-described manner, the emission of PMs was measured continuously. Note that the inlet-gas temperatures of exhaust gas into the filter catalysts were 240° C. on average. However, the inlet-gas temperatures rose temporarily up to 370° C. at the maximum in accelerating to 100 km/hr. Note that the maximum inlet-gas temperature corresponded to the driving condition in travelling at 200 km/hr.

When the accumulated emission of PMs reached 0.3 g after the diesel engine is started driving, the collecting rate of PMs was measured with a smoke meter for the filter catalysts, respectively. Table 1 below summarizes the measurement results as an initial collecting rate of PMs. Note that honeycomb filters exhibit such a characteristic that they show a relatively low collecting rate of PMs until a layer of deposited PMs is formed on the cellular walls. This results from the fact that low initial collecting efficiencies of PMs do not manner in systems, such as ordinary DPFs, in which PMs are deposited to a certain extent and are thereafter burned to regenerate the systems. On the other hand, the initial collecting efficiencies of PMs matter in continuous regenerative DPFs which are based on the assumption that no layer of deposited PMs is formed.

TABLE 1

| | Composition of Catalytic Layer | Fibrous Layer Composition | Fibrous Layer Porosity (by volume) | Initial Collecting Rate of PMs (%) | Remaining Amount of PMs (g) | Rate of Deposited Ashes (%) |
|---|---|---|---|---|---|---|
| Ex. #1 | $Pt/Al_2O_3$—$CeO_2$ | $Pt/Al_2O_3$ | Approx. 50% | 85 | 2.8 | 51 |
| Ex. #2 | Pt—$K/Al_2O_3$—$TiO_2$—$ZrO_2$ | $Pt/Al_2O_3$ | Approx. 50% | 86 | 2.5 | 42 |
| Ex. #3 | Pt—$K/Al_2O_3$—$TiO_2$—$ZrO_2$ | $Pt/TiO_2$ | Approx. 50% | 90 | 3.0 | 44 |
| Ex. #4 | Pt—$K/Al_2O_3$—$TiO_2$—$ZrO_2$ | Pt/Sic | Approx. 50% | 85 | 2.1 | 41 |
| Ex. #5 | Pt—$K/Al_2O_3$—$TiO_2$—$ZrO_2$ | Pt/Sic | Approx. 80% | 82 | 2.7 | 46 |
| Ex. #6 | Pt—$K/Al_2O_3$—$TiO_2$—$ZrO_2$ | Pt/Sic | Approx. 30% | 80 | 5.3 | 83 |
| Comp. Ex. #1 | Pt—$K/Al_2O_3$—$TiO_2$—$ZrO_2$ | None | Not Applicable | 72 | 5.8 | 84 |
| Comp. Ex. #2 | $Pt/Al_2O_3$—$CeO_2$ | None | Not Applicable | 94 | 6.2 | 102 |

Figure 2:
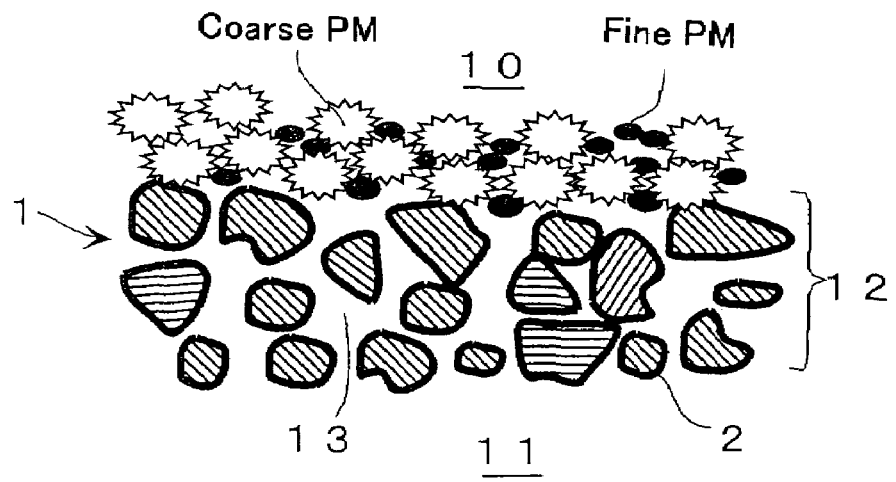
FIG. 2 is a schematic enlarged major cross-sectional view of a filter catalyst according to Comparative Example No. 1.
Figure 3:
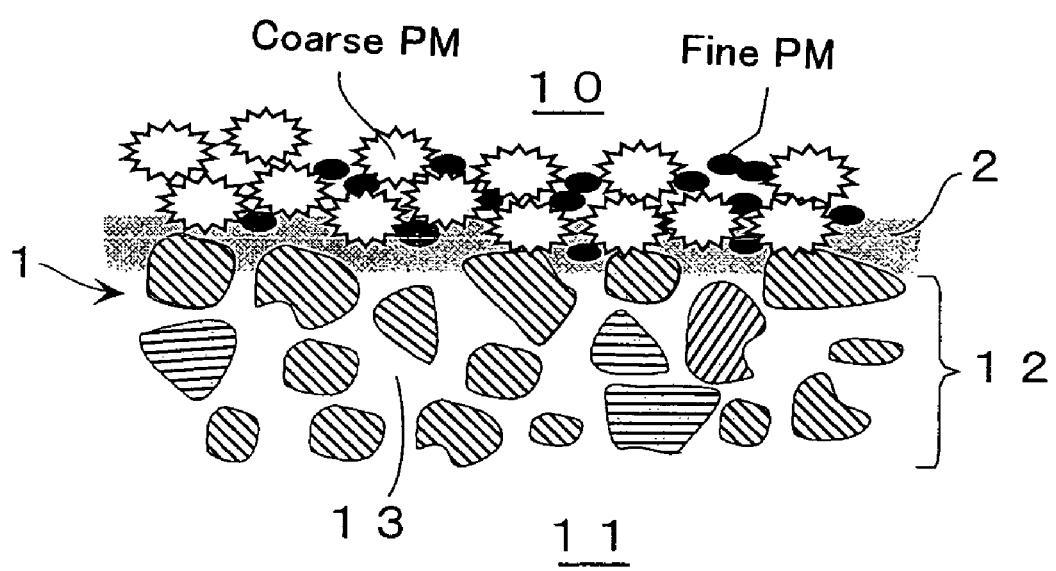
FIG. 3 is a schematic enlarged major cross-sectional view of a filter catalyst according to Comparative Example No. 2.

FIGS. 2 and 3 schematically illustrate the major cross-sectional view of the filter catalysts according to Comparative Example No. 1 and Comparative Example No. 2, respectively. As set forth in Table 1, the filter catalyst according to Comparative Example No. 2 exhibited a higher initial collecting rate of PMs than that of the filter catalyst according to Comparative Example No. 1. In the filter catalyst according to Comparative Example No. 1, the catalytic layer 2 was formed on the surface of the cellular walls 12 and on the inner surface of the pores 13 in a thin thickness as illustrated in FIG. 2. Accordingly, PMs came into the pores 13 with ease initially, and were emitted to the outlet cells 11 through the coarse pores. On the other hand, in the filter catalyst according to Comparative Example No. 2, the catalytic layer 2 closed the open pores of the cellular walls 12 as illustrated in FIG. 3. Consequently, the deposition layer of PMs was formed so promptly that PMs were inhibited from emitting. As a result, it is believed that the filter catalyst according to Comparative Example No. 2 exhibited a higher initial collecting rate of PMs than that of the filter catalyst according to Comparative Example No. 1. However, in view of the pressure loss, the filter catalyst according to Comparative Example No. 2 suffers from a drawback that the pressure loss would increase furthermore as PMs deposited, because it exhibited a large pressure loss initially. On the contrary, the filter catalyst according to Comparative Example No. 1 produces an advantage that the initial pressure loss would be less.

On the other hand, in the filter catalysts according to Example Nos. 1 through 6, the fibrous layer 3 existed which exhibited porosity to such an extent that it did not close the open pores. Accordingly, the filter catalysts according to Example Nos. 1 through 6 exhibited a higher initial collecting rate of PMs than that of the filter catalyst according to Comparative Example No. 1, and were simultaneously inhibited as well from exhibiting an increasing pressure loss. Moreover, in the filter catalysts according to Example Nos. 1 through 6, SOF in PMs were burned by the catalytic actions of Pt loaded on the fibrous layer 3, and PMs were decomposed to pulverize so that they came into the pores 13 of the cellular walls 12 and were eventually trapped there at, in addition to the physical advantageous effects. Consequently, it is believed that such a chemical advantageous effect occurred that PMs were less likely to deposit on the surface of the cellular walls 12.

After the above-described test was completed, the respective filter catalysts were removed from the exhaust system. Then, the respective filter catalysts were weighed for a weight $W_1$ after they were heated at 120° C. for 2 hours; were weighed for a weight $W_2$ after they were heated at 300° C. for 2 hours; were weighed for a weight $W_3$ after they were heated at 550° C. for 2 hours; and were weighed for a weight $W_4$ after they were blown with air in this order. Note that the weight reduction accompanied by the combustion of SOF can be expressed by the difference $W_2-W_1$; the weight, reduction accompanied by the combustion of carbon soot can be expressed by the difference $W_3-W_1$; the amount of ash components emitted by blowing with air can be expressed by the difference $W_4-W_1$, though there are certain errors. Moreover, the amount of unburned PMs (or the amount of remaining PMs) can be determined as $8.2-W_1$, because the total amount of PMs emitted in the above-described test was calculated as 8.2 g from the depositing amount of PMs which was determined by subjecting only the honeycomb filter 1 to the same test. Table 1 recites the remaining amounts of PMs (i.e., $8.2-W_1$) and the rates of deposited ashes (i.e., $\{(W_4-W_3)/W_3\}\times100$), which were calculated from the amounts of deposited ashes, as well.

As recited in Table 1, it is appreciated that the filter catalysts according to Example Nos. 1 through 6 exhibited a less remaining amount of PMs than that of the filter catalysts according to Comparative Example Nos. 1 and 2. Accordingly, the filter catalysts according to Example Nos. 1 through 6 burned PMs in a greater amount in the test. It is apparent that the advantage resulted from the fact that the fibrous layer 3 with Pt loaded was formed on the outermost surface of the cellular walls 12 of the inlet cells 10.

Moreover, the filter catalysts according to Example Nos. 1 through 5 exhibited a rate of deposited ashes which was reduced by a factor of about ½, compared with that of the filter catalysts according to Example No. 6 and Comparative Example Nos. 1 and 2. Ashes are usually dispersed as fine particles in the particles of PMs. However, when a layer of deposited PMs is formed on the surface of the cellular walls 12, the deposited PMs are burned thereafter to deposit ashes as agglomerated particles on the surface of the cellular walls 12. It is a distinctive example that the filter catalyst according to Comparative Example No. 2 exhibited a high rate of deposited ashes. Note that it is believed that the filter catalyst according to Comparative Example No. 1 exhibited a relatively high rate of deposited ashes in the following manner. When fine PMs coming into the pores 13 in the cellular walls 12 were burned catalytically, ashes were emitted as well. On the other hand, coarse PMs existing relatively abundantly deposited on the surface of the cellular walls 12 to close the open pores. Accordingly, the amount of PMs coming into the pores 13 decreased. Consequently, Pt which was loaded on the catalytic layer 2 formed in the pores 13 contributed to the oxidation of PMs initially when the diesel engine was started.

However, as the open pores were closed, the rate of oxidizing PMs degraded to the level equal to that of the filter catalyst according to Comparative Example No. 2.

In addition, the filter catalyst according to Example No. 6 exhibited a rate of oxidizing PMs which dropped relatively early, because the $TiO_2$ fibers were too fine to provide the fibrous layer 3 with a high porosity so that PMs formed a deposition layer relatively early. As a result, it is believed that the filter catalyst according to Example No. 6 showed a greater remaining amount of PMs than that of the filter catalysts according to Example Nos. 1 through 5, and thereby exhibited an increased rate of deposited ashes.

On the contrary, the filter catalyst according to Example No. 4 exhibited a lesser remaining amount of PMs, though it had the same arrangement as that of the filter catalysts according to Example Nos. 2 and 3. The advantage is believed to result from the fact that SiC fibers exhibit a higher thermal conductivity and are better in terms of the radiating property than $Al_2O_3$ fibers and $TiO_2$ fibers. As a result, the SiC fibers reacted to the temperature increment of inlet exhaust gases so sensitively that SOF in PMs were burned and removed much more effectively. It is possible to infer from the advantage that metallic fibers whose thermal conductivity is high are believed to be effective as a material for the fibrous layer 3.

What is claimed is:

1. A filter catalyst for purifying exhaust gases having coarse PMs and fine PMs entrapped therein, comprising:
    a honeycomb filter having a porosity of 60% by volume;
        inlet cells clogged on a downstream side of a flow of the exhaust gases through the honeycomb filter;
        outlet cells neighboring the inlet cells, and clogged on an upstream side of the flow of the exhaust gases through the honeycomb filter; and
        cellular walls demarcating the inlet cells and the outlet cells, the cellular walls having pores and a first porosity;
    a catalytic layer formed on a surface of the cellular walls and an inner surface of the pores, and including a support powder composed of a porous oxide and a catalytic ingredient loaded on the support powder; and
    a fibrous layer formed on the outermost surface of the cellular walls of the inlet cells, and including entangled fibrous substances composed of a heat-resistant material, the fibrous layer having a second porosity different from the first porosity;
    wherein the second porosity is 30%-80% by volume obtained by using the fibrous substances having an aspect ratio of 1 to 60;
    wherein an oxidizing catalyst is loaded on the fibrous layer;
    wherein the fibrous layer is applied to the outermost surface of the cellular cells in a unitary areal weight of from 3 to 11 $g/m^2$; and
    wherein the honeycomb filter is arranged such that the exhaust gases flow in sequence through said inlet cells, said fibrous layer, said cellular walls, and said outlet cells;
    wherein said fibrous layers first filters the coarse PMs from the exhaust gas, and subsequently the cellular walls filter the fine PMs from the exhaust gas.

2. The filter catalyst set forth in claim 1, wherein the oxidizing catalyst is at least one member selected from the group consisting of Pt, Rh and Pd, and is loaded on the fibrous layer in an amount of from 0.01 to 0.5 g with respect to 1 L of the honeycomb structure.

3. The filter catalyst according to claim 1, wherein the first porosity is from 60 to 80% by volume.

* * * * *